R. CUNNINGHAM & M. FRIAR.
PLOW.
APPLICATION FILED APR. 3, 1909.
978,564.
Patented Dec. 13, 1910.
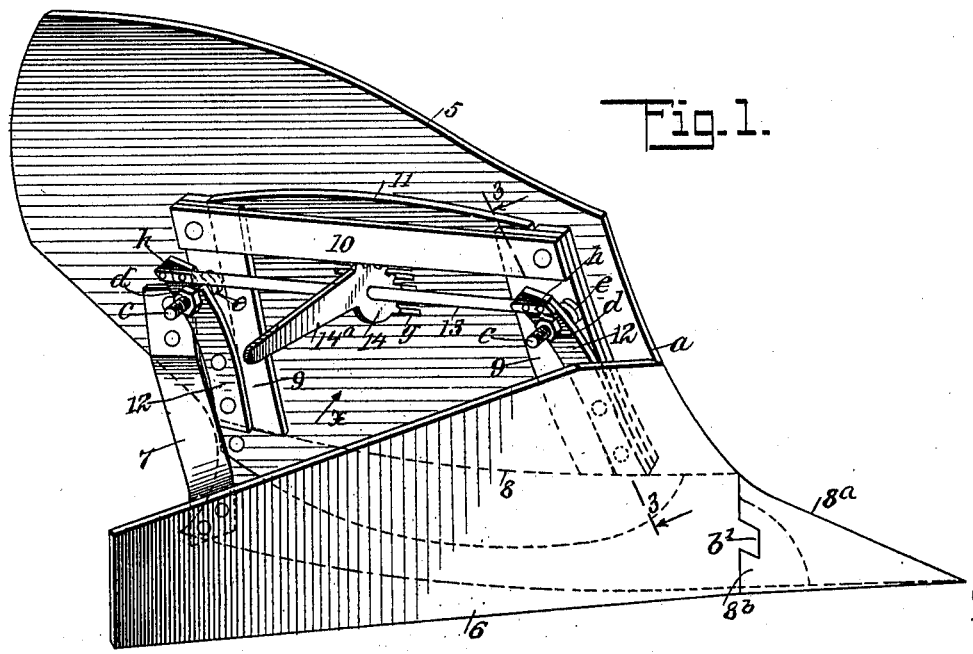
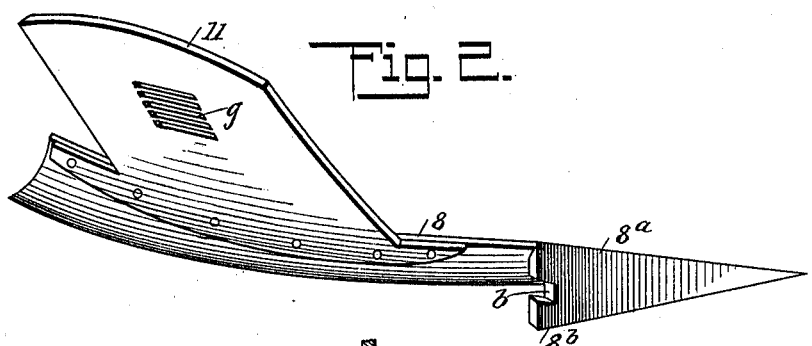
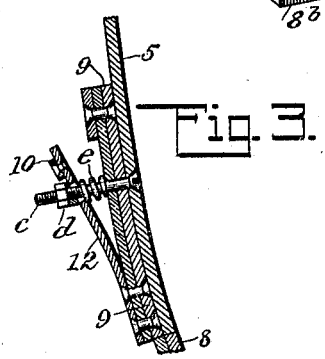
WITNESSES
INVENTORS
Richard Cunningham
Michael Friar
BY
ATTORNEYS

UNITED STATES PATENT OFFICE.

RICHARD CUNNINGHAM AND MICHAEL FRIAR, OF BLANCHARD, NORTH DAKOTA.

PLOW.

978,564.  Specification of Letters Patent.  Patented Dec. 13, 1910.

Application filed April 3, 1909. Serial No. 487,652.

*To all whom it may concern:*

Be it known that we, RICHARD CUNNINGHAM and MICHAEL FRIAR, both citizens of the United States, and residents of Blanchard, in the county of Traill and State of North Dakota, have jointly invented certain new and useful Improvements in Plows, of which the following is a full, clear, and exact description.

The purpose of our invention is to provide the mold-board of a right or left hand plow with a removable share of novel construction, and means for securing the same in position without the use of bolts; and a further object is to provide resilient connections between the mold-board and the plow share, which will absorb shocks that the latter may sustain if a stone or other obstacle is struck by the share, and thus prevent injury thereto.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a side view of the improved plow, showing novel details thereof by full and broken lines; Fig. 2 is a detached plan view of the plow share and point thereon, showing the inner side, seen in the direction of the arrow $x$ in Fig. 1; and Fig. 3 is an enlarged transverse sectional view of details, substantially on the line 3—3 in Fig. 1.

In the drawings, 5 represents a mold-board for a plow, having the usual form that adapts it to turn the soil over into a furrow when in use. Upon the front edge $a$ of the mold-board 5, which is inwardly and forwardly curved, the correspondingly shaped front edge of the landside 6 is secured by any suitable means, said landside of usual shape, being extended rearward for a proper length, and at the rear end connected with the rear portion of the mold-board by a transverse brace 7, as shown in Fig. 1.

The improved plow share 8, is shaped so as to correspond in the concavity of its outer surface with that of the mold-board, and when in position curves outwardly and downwardly therefrom, and at its front end terminates in a tapered point $8^a$, said point also constituting the front extension of the landside 6 and having a flat bottom plate $8^b$ thereon that seats in a furrow formed by the plow, and in the rear end of said bottom wall a recess $b$ is formed wherein a tenon $b'$ on the front end of the landside is entered and secured.

The means for connecting the plow share with the mold-board comprises the following details: Two similar guideways 9, 9, formed of flat strips of metal, are spaced apart and secured on the convex side of the mold-board that is opposite the landside 6, these guideways being connected together at their upper ends by a cross bar 10. On the share 8, at a suitable point, there is a tongue plate 11 secured by its lower edge, that laps upon the upper edge of the plow share, as is shown in Fig. 2. The tongue plate 11 has parallel side edges and a width between said edges that permits the free upward insertion of said tongue plate between the guideways 9, 9, and such a lateral curvature is given to the tongue plate as adapts it to fit closely against the inner surface of the mold-board 5. Upon the upright strips that form the guideways 9, 9, the lower portions of two similar plate metal bracket arms 12 are secured by rivets or the like, said arms curving toward the landside so as to space their upper ends from the guideways. The bracket arms 12 are formed of resilient metal and have spring action in service. Two stud bolts $c$, $c$, are affixed by one end of each in a respective guideway 9, and also in the mold-board 5, and thence project loosely through the corresponding bracket arms 12, said bolts each having a nut $d$ on the free end thereof that bears upon an adjacent arm 12. Between the arms 12 and the guideway strips 9, a strong coiled spring $e$ is mounted upon each stud bolt $c$ and presses upon the bracket arms, thus affording support therefor, but permitting the arms to flex toward the guideways if the point of the plow share strikes an obstacle. On the tongue plate 11 at its transverse center and near the upper edge thereon, a toothed rack $g$ is formed on the side of the tongue plate that faces the landside 6. A shaft 13 is extended between the upper ends of the resilient bracket arms 12 and is thereto connected at the respective ends thereof, as shown at $h$ in Fig. 1. On the shaft 13, a toothed sector 14 is loosely mounted, having its teeth meshed with the teeth on the rack g, and as shown in Fig. 1, an operating lever 14ª is formed on the sector 14 and projects therefrom toward the landside.

By the above described means the use of bolts is avoided and the share can be quickly applied or removed and when applied will be firmly and securely held in position.

As before mentioned, should the point 8ª of the plow share 8 strike against a stone or other obstacle, the shock will be cushioned by the springs e and the resilient bracket arms 12, so that injury to the plow will be prevented.

To adapt the improved plow for service, an ordinary plow beam and two handles are to be supplied and connected therewith in any preferred manner; these details having no bearing on the features of improvement, are omitted from the drawings.

Having thus described our invention, we claim as new and desire to secure by Letters Patent:

1. In a plow, the combination with a mold-board, of a share, and means for resiliently securing the share to the mold-board.

2. In a plow, the combination with a mold-board, of a share provided with an upwardly extending tongue having guided and sliding movement on the inner face of the mold-board, and means for resiliently securing the tongue to the mold-board.

3. In a plow, the combination with a mold-board having a guideway on its inner face, of a share provided with a tongue fitting in the guideway, and a member for locking the tongue in the guideway, said member being pivotally and resiliently mounted at the inner side of the mold-board.

4. In a plow, the combination with a mold-board, and guideways on the inner side of the mold-board, of a plow share, a tongue plate on the plow share that is fitted to slide in the guideways, and means for locking the tongue plate in the guideways.

5. In a plow, the combination with a mold-board, and a landside, of a share shaped to correspond to the outer face of the mold-board and provided with a point at its front end, the share being provided with an upwardly extending tongue having guided and sliding movement on the inner face of the mold-board, means engaging the tongue for locking the share in position, and a tongue and groove connection between the point of the share and the landside.

6. In a plow, the combination with a mold-board having a rack thereon and guideways on its inner face, of a share provided with a tongue fitting in the guideways, a toothed sector engaging the rack of the tongue, and means for mounting the sector on the inner face of the mold-board.

7. In a plow, the combination with a mold-board, guideways on the mold-board, a plow share, and a tongue plate on said plow share slidably engaging the guideways, of two resilient bracket arms on the guideways, and means carried by the bracket arms and engaging the tongue plate for locking the share in position.

8. In a plow, the combination with a mold-board, guideways on the mold-board, a tongue plate, a plow share from which the tongue plate extends upward, said tongue plate slidably engaging the guideways, and means for securing the tongue in the guideways, of two resilient bracket arms on the guideways and curved outward at their upper ends, threaded stud bolts projected from the guideways through the bracket arms, coiled springs on the stud bolts between the guideways and the bracket arms, and nuts on the outer ends of said bolts bearing upon the bracket arms.

9. In a plow, the combination with a mold-board, two spaced upright guideways on the inner side of the mold-board and connected at their upper ends with a cross bar, a plow share, a tongue plate extended upward from the plow share and inserted into the guideways, and two resilient bracket arms secured by their lower ends on the guideways and thence curving outward and upward, of a transverse shaft secured by its ends on the upper ends of the bracket arms, a toothed rack mounted on the inner side of the tongue plate, a sector having teeth and mounted on the shaft, said teeth engaging the toothed rack, and a lever extended from the sector for operating the same.

In testimony whereof we have signed our names to this specification in the presence of two subscribing witnesses.

RICHARD CUNNINGHAM.
MICHAEL FRIAR.

Witnesses:
ROBERT W. FALCONER
LEO BOETTCHER.